US009130988B2

(12) United States Patent
Seifert et al.

(10) Patent No.: US 9,130,988 B2
(45) Date of Patent: Sep. 8, 2015

(54) SCAREWARE DETECTION

(75) Inventors: Christian Seifert, Seattle, WA (US);
Jack Stokes, North Bend, WA (US);
Long Lu, Atlanta, GA (US); David Heckerman, Santa Monica, CA (US);
Christina Colcernian, Royal Oak, MI (US); Sasi Parthasarathy, Seattle, WA (US); Navaneethan Santhanam, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 13/159,978

(22) Filed: Jun. 14, 2011

(65) Prior Publication Data
US 2012/0159620 A1  Jun. 21, 2012

Related U.S. Application Data

(63) Continuation-in-part of application No. 12/974,703, filed on Dec. 21, 2010, now abandoned.

(51) Int. Cl.
*H04L 29/06* (2006.01)
*G06F 21/00* (2013.01)

(52) U.S. Cl.
CPC ........ *H04L 63/1483* (2013.01); *H04L 63/1416* (2013.01); *H04L 63/168* (2013.01)

(58) Field of Classification Search
CPC ............ H04L 63/1433; H04L 63/1483; G06F 21/128
See application file for complete search history.

(56) References Cited

U.S. PATENT DOCUMENTS

| 8,140,505 | B1 * | 3/2012 | Jain et al. ...................... 707/706 |
|---|---|---|---|
| 2006/0253582 | A1 * | 11/2006 | Dixon et al. .................. 709/225 |
| 2007/0118528 | A1 * | 5/2007 | Choi et al. ........................ 707/9 |
| 2008/0010683 | A1 * | 1/2008 | Baddour et al. ................ 726/24 |
| 2008/0092242 | A1 * | 4/2008 | Rowley ........................... 726/27 |
| 2008/0163369 | A1 * | 7/2008 | Chang et al. .................... 726/22 |
| 2008/0178286 | A1 * | 7/2008 | Deyo ............................... 726/22 |
| 2008/0289047 | A1 * | 11/2008 | Benea et al. .................... 726/27 |
| 2009/0055928 | A1 * | 2/2009 | Kang et al. ...................... 726/22 |
| 2009/0094697 | A1 * | 4/2009 | Provos et al. ................... 726/23 |
| 2009/0198673 | A1 | 8/2009 | Gao et al. |

(Continued)

OTHER PUBLICATIONS

Aburrous, et al. "Predicting Phishing Websites using Classification Mining Techniques with Experimental Case Studies," ITNG 2010, Apr. 12-14, 2010, pp. 176-181.*

(Continued)

*Primary Examiner* — Jung Kim
*Assistant Examiner* — Robert Leung
(74) *Attorney, Agent, or Firm* — Dave Ream; Jim Ross; Micky Minhas

(57) ABSTRACT

A machine-implemented method for detecting scareware includes the steps of accessing one or more landing pages to be evaluated, extracting one or more features from the landing pages, and providing a classifier to compare the features extracted from the landing pages with features of known scareware and non-scareware pages. The classifier determines a likelihood that the landing page is scareware. If determined to be scareware, the landing page is removed from search results generated by a search engine. The features can be URLs, text, image interest points, image descriptors, a number of pop-ups generated, IP addresses, hostnames, domain names, text derived from images, images, metadata, identifiers of executables, and combinations thereof.

20 Claims, 10 Drawing Sheets

(56) References Cited

U.S. PATENT DOCUMENTS

| | | | |
|---|---|---|---|
| 2010/0095375 A1* | 4/2010 | Krishnamurthy et al. | 726/22 |
| 2010/0186088 A1* | 7/2010 | Banerjee et al. | 726/23 |
| 2010/0205665 A1 | 8/2010 | Komili et al. | |
| 2010/0251380 A1* | 9/2010 | Zhang et al. | 726/26 |
| 2010/0281536 A1* | 11/2010 | Richards et al. | 726/22 |
| 2012/0117122 A1* | 5/2012 | Wang et al. | 707/797 |

OTHER PUBLICATIONS

Cordero, et al. "Catching Phish: Detecting Phishing Attacks From Rendered Website Images," Dec. 12, 2006, University of California, Berkeley.*

Pan, et al. "Anomaly based web phishing page detection," Computer Security Applications Conference, 2006.*

Fu, et al. "Detecting Phishing Web Pages with Visual Similarity Assessment Based on Earth Movers Distance (EMD)," IEEE Transactions on Dependable and Secure Computing, vol. 3, No. 4, Oct.-Dec. 2006, pp. 301-311.*

U.S. Appl. No. 12/421,644, Stokes, et al.

Moshchuk et al., "Crawler-Based Study of Spyware on Web", http://www.chadmarcumn.com/resources/security/spycrawler.pdf, 2005.

Cova et al., "Analysis of Rogue Av Campaigns", http://www1.cs.columbia.edu/~angelos/Papers/2010/rogueAV.pdf, Retrieved Sep. 21, 2010.

T. DeShane, "Attack-Resistant and Rapid Recovery Desktop Systems" http://toddeshane.net/phd/Todd-Deshane-PhD-Dissertation.pdf, 2010.

Kirda et al., "Behavior-Based Spyware Detection", http://www.usenix.org/events/sec06/tech/full_papers/kirda/kirda_html, Retrieved Sep. 21, 2010.

Rajab et al., "Nocebo Effect on the Web an Analysis of Fake Anti-Virus Distribution", http://www.usenix.org/event/leet10/tech/full_papers/Rajab.pdf, 2010.

Microsoft Corporation, "Watch Out for Fake Virus Alerts", http://www.microsoft.com/security/antivirus/rogue.aspx, Retrieved Sep. 21, 2010.

Winder et al., "Picking the Best DAISY", International Conference on Computer Vision and Pattern Recognition (CVPR09)—Miami, 6/200; pp. 178-185.

* cited by examiner

SCAREWARE DETECTION

RELATED APPLICATION

This application is a continuation-in-part of, and claims priority to U.S. patent application Ser. No. 12/974,703, the disclosure of which is incorporated by reference herein.

BACKGROUND

A scareware webpage is a webpage that misrepresents itself to a computer user by offering supposedly legitimate malware solutions when such malware solutions are actually unnecessary. Scareware webpages present false malware scanning activity and/or forge malware detection results, to thereby prey on users' anxieties and trick users into paying for unnecessary malware protection services or software. Furthermore, rather than protecting a user's computer, software downloads and services from scareware webpages often have just the opposite effect. Scareware software and services themselves often include malware that can take control of a user's computer (e.g., while pretending to monitor for the presence of viruses), allow other attackers access to the user's computer, or otherwise harm the user's computer. Consequently, scareware webpages can doubly harm a user by first obtaining payment for unnecessary software and secondly by installing malicious software onto the user's computer.

SUMMARY

Embodiments described herein relate to techniques for detecting scareware. More specifically, embodiments relate to detecting scareware by a search engine. These techniques make use of one or more features of webpages. For example, features commonly associated with scareware webpages can be detected. After scareware is detected, its harmful effects can be mitigated. Although embodiments are described as being executed by a search engine, at least some techniques could be implemented in other web-based systems, such as a web browser.

One embodiment includes a machine-implemented method for detecting scareware involving accessing a webpage to be evaluated, extracting one or more features from the webpage, and providing a classifier to compare the features extracted from the webpage with features of one or more known scareware pages and one or more non-scareware pages. The classifier determines a likelihood that the webpage is a scareware page.

In some embodiments, the webpage to be evaluated is a landing page, which is a webpage to which the web browser navigates when the user clicks on (e.g., selects with a mouse or other input device) a webpage reference, such as a uniform resource locator (URL), webpage advertisement or search engine result hyperlink. In some embodiments, a landing page is a "lead capture page", which is an entry page to a collection of webpages at a website. For example, search engines present URLs, advertisements and other references to landing pages.

In various embodiments, the extracted features are selected from the group comprising uniform resource locators (URLs), text, image interest points, image descriptors, a number of pop-ups generated, Internet Protocol (IP) addresses, hostnames, domain names, text derived from pop-ups, images, metadata, identifiers of executables, and combinations thereof.

At least one embodiment of a method further includes constructing at least one feature vector for one or more landing pages, redirection pages, and scareware pages. The constructed feature vector is stored and compared with at least one feature vector of one or more known scareware pages and one or more non-scareware pages. Alternatively, the feature vector is evaluated using a classifier trained to detect scareware.

In at least one embodiment, the one or more features are images, and the method further includes detecting one or more interest points in the features, computing a descriptor at each interest point, and matching the interest points detected in the features with one or more interest points from a database of interest points corresponding to feature images which represent known scareware attack images. The descriptor is a vector associated with each interest point, and matching is performed by comparing the descriptor of one or more interest points in the unknown image under consideration with the descriptors of other interest points corresponding to a set of feature images from known scareware attacks in a database. A scalar may be computed to indicate a likelihood of a match.

At least one embodiment includes a method for removing a landing page from search results generated by a search engine when the landing page is determined to execute or include scareware. In some embodiments, one or more redirection pages are also removed from search results.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

One or more example embodiments are described below in detail with reference to the accompanying drawings, in which like elements are represented by like numerals, and in which.

DETAILED DESCRIPTION

Overview

Various embodiments enable scareware pages and pages that redirect a user to scareware pages to be detected and tagged for removal from search results displayed by a search engine. Malicious advertisements such as paid search ads or display ads can also cause the landing page to redirect to a scareware attack. Some embodiments further enable these malicious advertisements to be removed from consideration and/or prevented from being displayed to the end user. In one or more embodiments, a classifier is trained and used to evaluate unknown, or not yet evaluated, pages to determine if a given page is a scareware page or non-scareware page. Features including text, pop-ups, HTML, and images are extracted from webpages and compared with features known to be associated with scareware pages or non-scareware pages.

In the discussion that follows, a section entitled "Example Operating Environment" describes an operating environment in accordance with one or more embodiments. Next, a section entitled "Example Embodiment" describes an example search engine in accordance with one or more embodiments. A section entitled "Feature Extractor" describes an example feature extractor in accordance with one or more embodiments, such as a feature extractor incorporated in the search engine described in the Example Embodiment section.

Next, a section entitled "Example Classifier" describes example classifiers in accordance with one or more embodiments. A section entitled "Preprocessing" describes processes for use in accordance with one or more embodiments. Preprocessing includes, by way of example and not limitation, generation of image descriptors, interest points, and kd-trees. Next, a section entitled "Statistical Image Classification" further describes the use of statistical analysis to determine whether a page is a scareware page or a non-scareware page. In a section entitled "Example Embodiment," an example of a process for determining if a webpage is a scareware page is described. Finally, a section entitled "Example Computing System" describes a computing system that can be used to implement one or more embodiments.

Example Operating Environment

Figure 1:
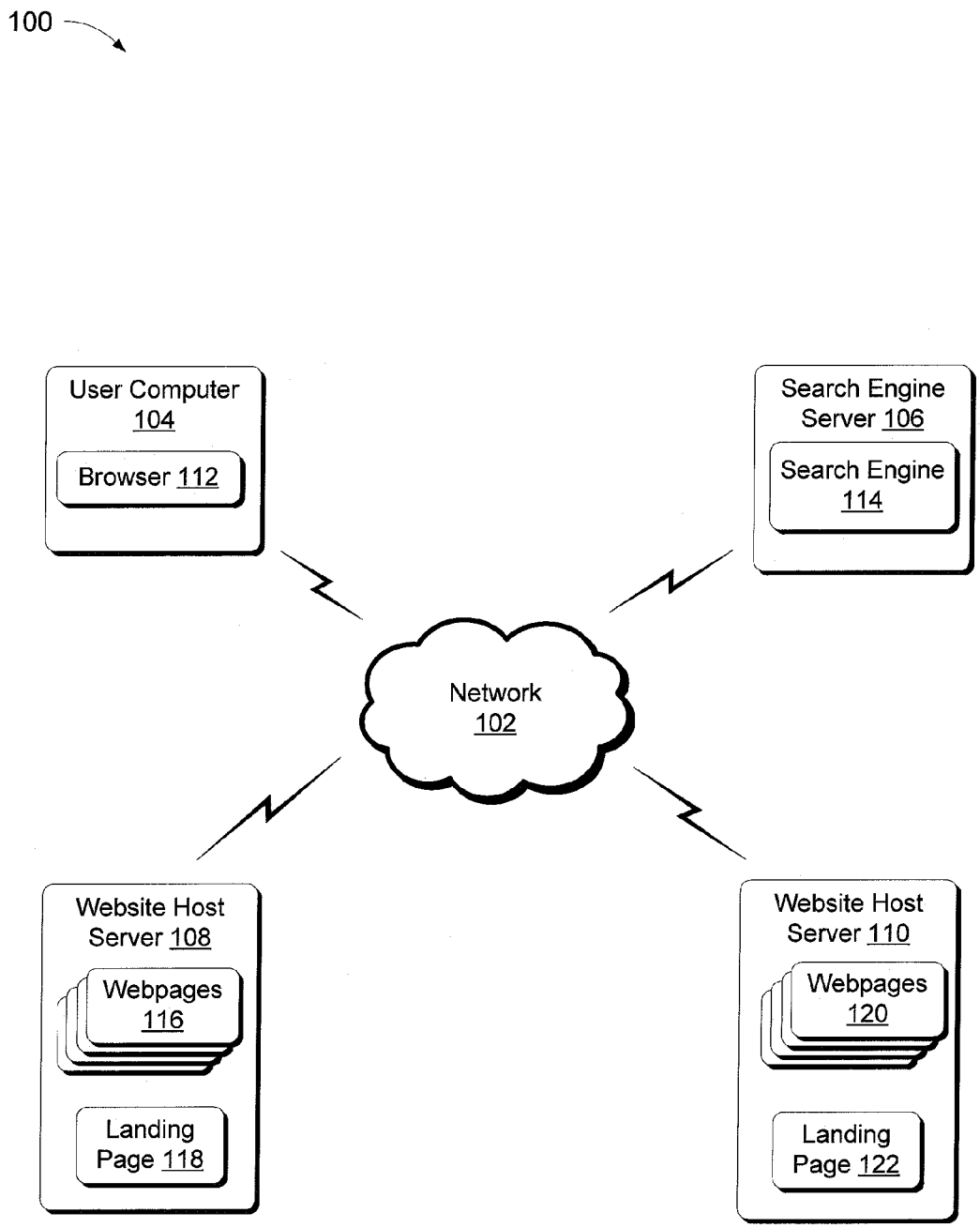
FIG. 1 illustrates an example network environment in which described embodiments may operate.

FIG. 1 illustrates an example network environment 100 in which embodiments described below may be implemented. Generally, numerous computing devices are communicably coupled to a network 102. In embodiments described herein, the network 102 is the Internet, although the techniques described are also applicable to other networks, such as intranets (e.g., enterprise networks), or others, or combinations thereof. The network 102 may physically include numerous interconnected subnetworks, which are not shown in FIG. 1, but which facilitate the communication of devices across the network 102. The computing devices may be physically connected to the network 102, wirelessly connected to the network 102, or combinations thereof. Via the network 102, the various computing devices can communicate data in various forms to each other.

For ease of illustration, four computing devices are shown in FIG. 1: a user computer 104, a search engine server computer 106, a first website host server computer 108, and a second website host server computer 110. In an actual operating environment, many more (e.g., hundreds of thousands or millions) computing devices than that shown in FIG. 1 may communicate via the network 102. The user computer 104 executes a web browser 112 (or simply "browser"), which is a computer application that navigates to webpages on computers coupled to the network 102. The browser 112 responds to user input (e.g., mouse clicks on hyperlinks) by retrieving webpage definition data and presenting the corresponding webpage to the user on the computer screen.

The user may want to find websites of interest. In this regard, the user can interact with the browser 112 to navigate to a search engine 114 hosted on the search engine server computer 106. The search engine 114 is a computer application that receives input data (e.g., text) from the user, via the browser 112, and responsively searches for websites related to the input data. The search engine 114 returns search results back to the browser 112 in the form of a list of hyperlinks referencing webpages found during the search. The list of hyperlinks are presented on the screen to the user and the user can then select one or more of the hyperlinks to navigate to the associated webpages.

For example, a hyperlink may appear in the search engine 114 search results that refers to webpages 116 hosted at website host server computer 108. Website webpages 116 typically include a collection of related webpages 116, of which one webpage may be a landing page 118. The landing page 118 is the entry webpage (e.g., a lead capture page) to which the user initially navigates at the website host server computer 108. The search results provided by the search engine 114 typically, although not necessarily, will include only links to the landing pages of search result websites, rather than links to all the webpages at the websites, because the website host generally wants web browsers to enter the website at a common entry point. The landing page 118 generally has a structure with webpage references, such as hyperlinks, that the user can use to navigate among the website webpages 116 or other webpages.

As another example, search results from the search engine 114 may list hyperlinks referencing another website of webpages 120 hosted by website host server computer 110. Alternatively, or in addition, one or more of the first website webpages 116 may include user selectable references, such as hyperlinks or advertisements, which direct the user's browser 112 to a webpage in the second group of website webpages 120. As such, upon navigating to the first website, the user's browser may navigate away from website to another website. The second website webpages 120 may also include a landing page 122, where the browser 112 enters the second website. Those skilled in the art will appreciate that any given website may include multiple interconnected server computers that host the website and distribute webpages in a coordinated fashion.

Webpages, such as webpages 116 and webpages 120, are defined by webpage definitions that include browser executable elements, such as code and/or applications (e.g., applets). Examples of browser executable code are Hypertext Markup Language (HTML) (or other markup language) Rich media content can include media (e.g., video, image, text, graphical) presentation applets.

Browser executable elements of a webpage definition can execute automatically when the browser 112 navigates to the webpage. Among other automatic effects, some browser executable elements can cause automatic presentation of additional webpages, windows or other output (e.g., audio, images, video, graphics, messages) at the user computer 104. Some automatically generated presentations are referred to as "pop-ups" because they pop up on the user's computer display even if the user may not want them to appear.

Many websites and webpages provide honest, legitimate services or products to the user, via the user's browser. However, some webpages exist that can include elements that harm the user's computer 104, by, for example, and without limitation, automatically redirecting the browser 112 to a harmful website without the user's control, automatically downloading malware, automatically presenting unwanted pop-ups, intruding on the user's privacy, deceiving the user, or others, causing other harmful effects.

Such harmful browser executable elements may include scareware, examples of which are described in more detail below. Webpages whose definitions include scareware are referred to as scareware webpages. Server computers that host scareware webpages are referred to as scareware server computers or scareware servers. Websites that include scareware webpages or lead to a scareware attack are referred to as scareware websites. When scareware is present at a website, it may be on any webpage at the website, such as the landing page, or some other webpage at a different level in the website structure. By contrast, a "non-scareware" webpage is a webpage that does not include scareware or have characteristics or properties associated with scareware.

Embodiments of systems and processes are described below that beneficially detect scareware. Responsive to detecting scareware, the associated scareware webpage(s) can be avoided or other remedial action can be taken. Such embodiments are described with reference to being implemented within, or working in conjunction with, a search engine (e.g., search engine 114). However, one or more components of the scareware detection systems and processes may be included in, or work in conjunction with, a browser (e.g., browser 112) on a user's computer (e.g., user computer 104).

Scareware refers to software that is executed in association with a navigation (e.g., by a web browser) to a scareware webpage with the intent of scaring a user into believing the user's computer is infected with malware, when the user's computer is actually not infected. In a typical scareware attack, when the scareware is activated, various images and/or videos are displayed which mimic a virus scan and trick the user into believing that the computer is infected with one or more viruses. These images appear to the user to be legitimate screenshots, but they may not be legitimate. Often, a progress bar appears dynamically to create the illusion that the computer is being scanned for viruses. After the progress bar completes, apparently indicating that the scan has finished, warning pop-ups are often presented to the user to falsely indicate that one or more viruses were detected. The scareware may then offer to remove the detected viruses or download software to fix the problem for a price. An anxious user may thereby be tricked into providing payment (e.g., via his credit card number) for what the user believes to be, but is actually not, a legitimate service or software download.

Even more insidiously, services or software provided by scareware webpages often do harm to the user's computer. There are numerous harmful techniques that an attacker can employ through the use of a scareware webpage. One technique is commonly referred to as a drive-by download. A drive-by download involves downloading a piece of malware to the user's computer without the user's consent. The downloaded malware exploits vulnerability of the victim's computer. An example drive-by download process is shown in FIG. 2.

Upon user input of a URL (either by typing the URL into a web browser or clicking on a link), the URL causes the browser to render content from the initial landing page 200, the page first visited by the user, which resides on the landing page server 210. Content on the landing page 200 causes the browser to be redirected to a first redirection page 230 hosted on a first redirection server 220. Similarly, content on the first redirection page may redirect the browser to a second redirection page 250 hosted on a second redirection server 240. Eventually, the redirections, no matter the number, reach the scareware page 270 located on the scareware server 260. The number of redirections will vary depending on the specific scheme established by the attacker, and will be one or more in number. For example, in some embodiments, content on the landing page 200 causes the browser to be redirected to the scareware page 270 hosted on the scareware server 260, while in other embodiments, there are multiple redirection pages, such as first redirection page 230 and second redirection page 250, to which the user is redirected before being redirected to the scareware page 270. In still other embodiments, the user inputs a URL of the scareware page 270. At some point in the redirection chain, malicious content is introduced to cause a malicious redirection to the final scareware page. In some instances, the attacker installs a malicious malware executable 280 on the user's computer. The malware executable 280 can reside on the scareware server 260 or another malware distribution server.

Figure 2:
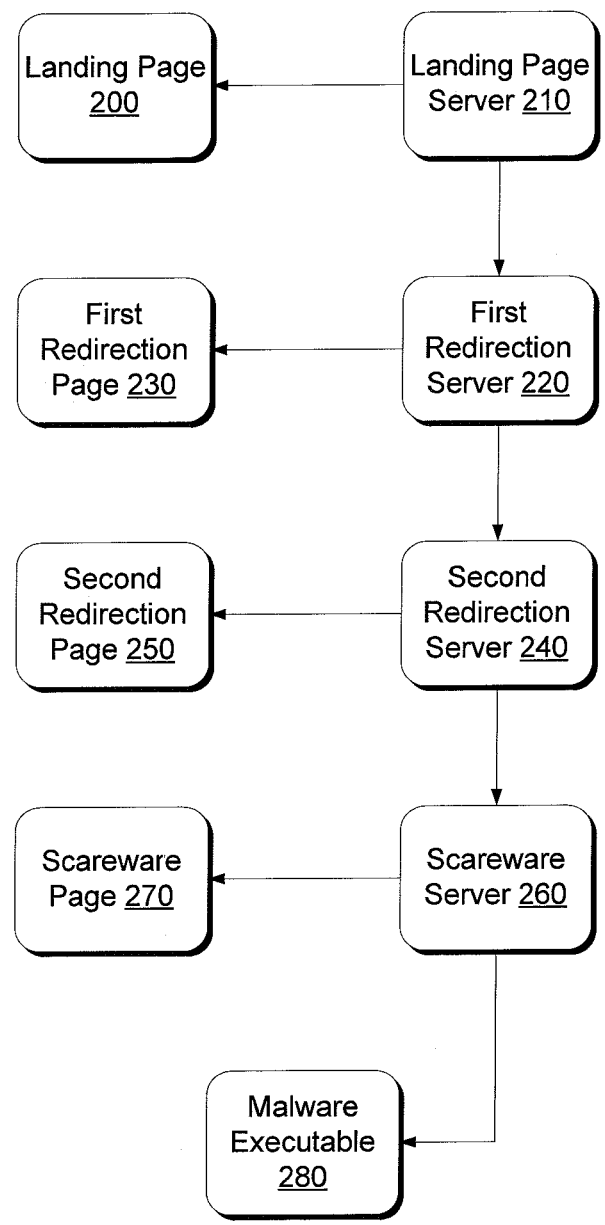
FIG. 2 is a flow chart depicting a known example drive-by download process commonly used by attackers.

At any step in the process shown in FIG. 2, the content can be legitimate or malicious. An example of legitimate content is an advertisement that dynamically serves different content located on the redirection server. For example, an advertising agency serves one ad, one day but serves a different ad the next day. Malicious content that causes a redirection can be due to a hacked webpage where the content is inserted by the attackers, malicious advertisements re-syndicated from legitimate advertisers, or malicious widgets (e.g., counters or clocks) inadvertently used by legitimate webpage authors.

Another technique involves using a script (e.g., JavaScript®) (JavaScript® is a registered trademark of Oracle America, Inc.) to generate a pop-up which tries to entice the user to click and install the fake anti-virus program. An actual pop-up (not an animation) is generated to get the user to inadvertently give permission to download one or more pieces of malware to the user's machine under the ruse of downloading the fake anti-virus program. Alternatively, the user clicks on a link on a webpage which tries to download a piece of malware to the computer. As with the pop-up technique, the user inadvertently provides consent to download the malware.

In scareware attacks using hyperlinks (e.g., selecting an advertisement or link on a webpage), the URL input by the user causes the browser to render content from the initial landing page. The landing page causes the browser to be redirected to a scareware page residing on the scareware server. As above, in some instances, the attacker installs a malicious executable on the user's computer. However, a download pop-up is shown that requires the user to take some action to begin the downloading of the malware rather than automatically downloading the malware as in the drive-by-download case.

With search engines being the primary driver of traffic to scareware sites, it is desirable to detect scareware pages and remove them from search engine search results, thereby reducing the likelihood that the user will navigate to the scareware pages. Harmful effects of scareware pages can thereby be reduced or eliminated.

Example Embodiment

Figure 3:
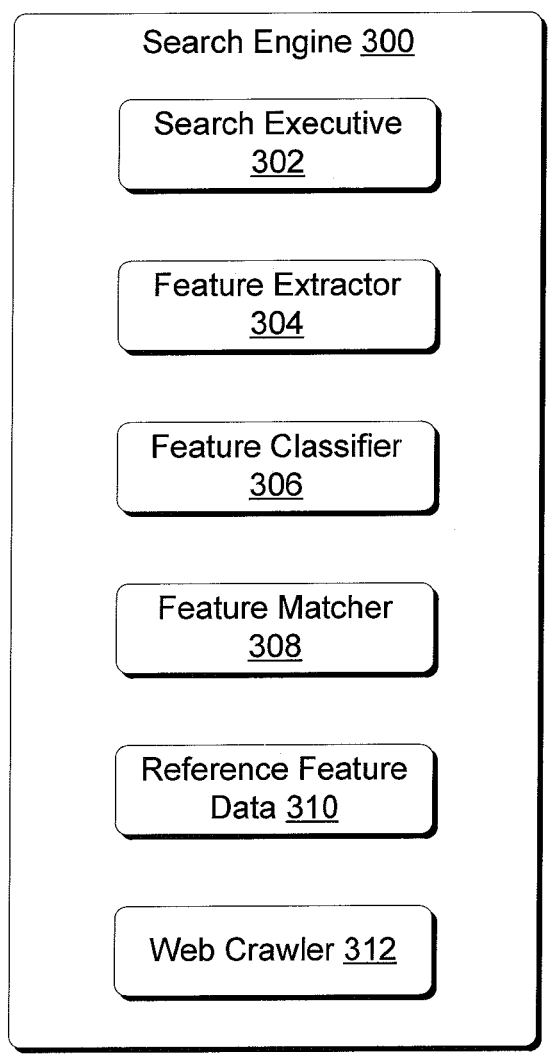
FIG. 3 is a module diagram illustrating example functional modules that may be included in a search engine according to an embodiment.

FIG. 3 is an example functional module diagram of a search engine 300 in accordance with one embodiment. The example search engine 300 includes a search executive 302, which performs functions generally associated with searching for webpages in response to a user search query. The search engine 300 also includes a feature extractor 304, feature classifier 306, a feature matcher 308, reference feature data 310, and a web crawler 312.

In general, the feature extractor 304 can identify and/or extract one or more features from webpages. The feature classifier 306 classifies features identified in and/or extracted from webpages as being indicative of scareware or non-scareware. The feature classifier stores reference feature data 310.

The feature matcher 308 compares features of unknown webpages with features that have been classified as being indicative of scareware in order to determine if a given unknown webpage includes scareware. A web crawler 312 methodically accesses webpages to be evaluated for scareware.

Reference feature data 310 can include any extracted feature data and classified features, or other feature-related data, and can include information on the feature and its classification. For example, reference feature data 310 can include, but is not limited to, feature identifiers, feature classification data, labels, and feature vectors, examples of which are discussed further below. Example embodiments of a feature extraction, feature classification and feature matching are discussed below.

In one embodiment, the search engine 300 evaluates webpages to determine if they are scareware webpages. The search engine 300 can evaluate webpages when a search query is received or on a regular, methodical basis (e.g., with a web crawler) without regard to particular search queries. If the evaluation is performed at the time that a search query is received, any pages that are determined to be scareware pages are not included in the search results list. In both cases, the results of the evaluation are kept locally (e.g., in reference feature data 310) so that they can be used later.

Feature Extractor

In some embodiments, a classifier is built using feature extraction (e.g., by the feature extractor 304) on a sample of webpages that are known to be scareware pages or non-scareware pages. In the embodiment shown in FIG. 4, the feature of interest to be extracted is text. Text can be used to detect scareware based upon detection of suspicious keywords in pop-ups, landing pages, and redirection pages through the use of text matching. Text in the pop-ups and code on an unknown webpage (e.g., HTML, JavaScript®, etc.), or on the rendered webpage can be compared to text employed in known scareware attacks. In various embodiments, a dynamic web crawler ("dynamic crawler", also known as a "web spider" or "web robot") is used. A dynamic crawler is a program or automated script which browses the World Wide Web in a methodical, automated manner. Although crawlers are primarily used by search engines to provide up-to-date data, they can also be used to gather specific types of information from webpages, such as harvesting content information on the pop-ups and webpages.

Figure 4:
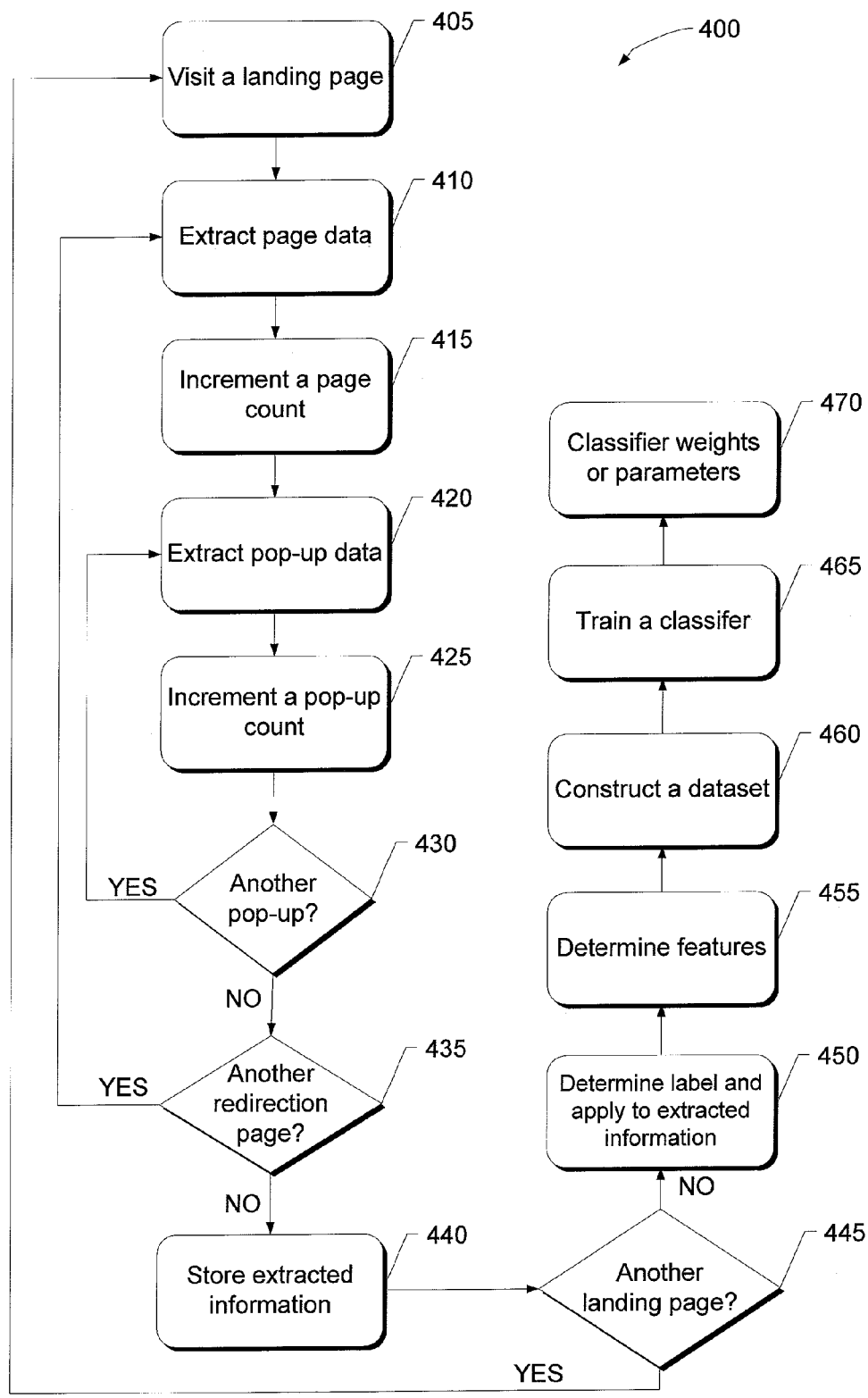
FIG. 4 is a flow chart depicting an embodiment of a process for building a classifier based on text extraction.

In some embodiments, a dynamic web crawler (e.g., web crawler 312) visits a landing page and determines if a scareware attack has occurred using pop-ups and/or a drive-by download attack. In order to create a scareware classifier, data from the pop-ups, landing pages, and redirection pages is mined, and a set of features which discriminate between scareware and non-scareware pages is extracted from the data. FIG. 4 depicts an example of a process 400 for building a scareware classifier. The process can be implemented in connection with any suitable hardware, software, firmware, or combination thereof. In at least some embodiments, the process can be implemented by a search engine server, examples of which are provided above. At block 405, the crawler visits a landing page in a sample including a plurality of landing pages. At block 410, the system extracts page data from the page. Page data includes, but is not limited to, text, URLs, JavaScript® snippets, and other data. Next, at block 415, a page count is incremented. The number of pages, including the landing page, redirection pages, and scareware pages can be a feature.

At block 420, the system extracts pop-up data for a pop-up generated by the current page. Pop-ups can be generated on the landing page, any of the redirection pages, the scareware page, and any combination thereof. Pop-up data can include text, images, URLs, an IP address associated with the pop-up, and other data included in the pop-up. Text extraction allows for the detection of particular words appearing in the pop-up (such as "infected," "suspicious," "malware," or "anti-virus") to be analyzed. Words commonly appearing in scareware pop-ups can be manually selected or can be automatically determined, depending on the specific application contemplated. In embodiments employing automatic determination of words to discriminate between scareware pop-ups and non-scareware pop-ups, a set of substantially all words occurring in scareware pop-ups is created, along with a set of substantially all words occurring in non-scareware pop-ups. An automatic feature selection method (described below) is then used to determine which words are most effective at discriminating between the scareware and non-scareware pop-ups.

Another feature is the number of pop-ups encountered during an attack. Therefore, at block 425, a pop-up count is incremented. In other words, the number of pop-ups encountered from navigation to a landing page is counted.

At block 430, a decision is made as to whether another pop-up is encountered. If so, the process returns to block 420 and begins data extraction from the next pop-up. The storage of information occurs for each pop-up encountered on the page.

In some embodiments, the landing page leads to a series of redirection, such as shown in FIG. 2. Therefore, if no further pop-ups are encountered, or when all pop-ups have been processed, at block 435, the system determines if the page is associated with any redirection pages. If there is another redirection page (a redirection page, a scareware page, or some other page associated with the current page), the process returns to block 410 and extracts the page data of the next page. If the system decides that all the redirection pages associated with the landing page have been processed, at block 440, the system stores the extracted information. Features can be extracted from landing pages and redirection pages in addition to the pop-ups to enhance the classifier.

At block 445, the system decides if additional landing pages in the sample of the plurality of landing pages is to be evaluated. If another landing page in the sample is to be evaluated, the process returns to block 405 and begins again with the next landing page in the sample. After the landing pages in the sample have been evaluated or no other landing pages are to be evaluated as determined in block 445, the process in FIG. 4 proceeds to block 450.

At block 450, the system determines whether each landing page in the sample ultimately caused a scareware attack to be rendered. If a scareware attack was rendered, substantially all of the page data and pop-up data associated with a landing page (and any associated redirection pages) leading to a scareware attack is stored with a "scareware" label. If no scareware attack was rendered, the page data and pop-up data associated with a landing page (and any associated redirection pages) leading to a scareware attack is stored with a "non-scareware" label. Other labels can be used, depending on the specific application contemplated. Labels can be determined manually or automatically, depending on the particular embodiment.

At block 455, the system determines features which discriminate between scareware and non-scareware pages. Processed features are extracted from the raw data obtained. In some embodiments, each word feature is treated as a sparse binary feature. That is, if the word is present in the pop-up or page, the feature is set to true, indicating that the feature is present. Conversely, if the word does not exist in the pop-up or page, the corresponding feature is set to false, indicating that the feature is not present. In some such embodiments, only the features that are true are stored to increase efficiency.

In alternate embodiments, numeric features rather than sparse binary features are used to indicate how many times a word appears in the pop-up or page. In such embodiments, if a word indicative of scareware (such as "infected") is a feature word and occurs twice in a pop-up or page, the corresponding feature is given a value of "2" instead of true. Correspondingly, a number can be allocated to the word count range within which the frequency of a scareware feature word appears relative to the appearance of seemingly harmless words (for example, the classifier can be trained to detect all landing pages that use the term "virus" within five or fewer words of the term "prevent").

As previously mentioned, the system can employ automatic feature selection. One method to automatically select features is to first create a 2×2 contingency table for each possible feature. For example, the 2×2 contingency table for the potential feature word "infected" would consist of four elements in the table. After the contingency table has been computed for each potential feature, a score can be evaluated according to the following:

$$R = [\log(\Gamma(c_{11}+1)) + \log(\Gamma(c_{12}+1)) + \log(\Gamma(c_{21}+1)) + \\ \log(\Gamma(c_{22}+1)) + \log(\Gamma(c_{11}+c_{12}+c_{21}+c_{22}+4))] - \\ [\log(\Gamma(c_{11}+c_{12}+2)) + \log(\Gamma(c_{21}+c_{22}+2)) + \\ \log(\Gamma(c_{11}+c_{21}+2)) + \log(\Gamma(c_{12}+c_{22}+2)) + \log(\Gamma(4))] \quad (1)$$

In Equation (1), $\Gamma(\ )$ is the Gamma function, $c_{11}$ is the count of the number of times the word "infected" occurs in scareware pages, $c_{12}$ is the count of the number of times the word "infected" does not occur in scareware pages, $c_{21}$ is the count of the number of times the word "infected" occurs in non-scareware pages, and $c_{22}$ is the count of the number of times the word "infected" does not occur in non-scareware pages. The potential features can then be ranked according to the R scores, and the top N features selected which best discriminate between scareware and non-scareware pages. N is selected based on the number of labeled samples. For example, in some embodiments, N is selected to be less than or equal to 1/10 of the total number of labeled examples. Alternative scoring metrics can be chosen such as those based on mutual information or the principle of maximum entropy.

Also, instead of considering scareware versus non-scareware pages for feature selection, equation (1) can be used to select features for an individual type of scareware attack. For example, one organization may use one set of webpage features, popup features, and scareware images for their attacks while a second organization may use a different set of the various features. A different set of features, in the total set of features, can be selected which target a specific type of attack. For example, the complete feature vector might include L1 features for attack class 1, L2 features for attack class 2, L3 features for general scareware attacks, L4 features for benign pages of class 1, L5 features for benign pages of class 2, and L6 features for general benign pages. To achieve this, equation (1) can be used to rank features for each individual class (e.g. scareware attack class 1, general scareware attack, benign class 2, general benign pages, etc.).

Next, at block 460, a dataset is constructed from the extracted features, including words, text, URLs, pop-up count, page count, and other data. The labeled dataset consists of a large number of example pop-ups, landing pages or redirection pages where the label (scareware or non-scareware) is known. Once the dataset has been constructed, at block 465, the dataset is used to train the classifier.

Training of the classifier can be accomplished according to one of several methods. For example, in some embodiments, a text classifier is trained based on a decision tree algorithm, while other algorithms, including but not limited to logistic regression, support vector machine, neural network, nearest neighbor classifier, or boosted or ensemble methods, such as boosted decision trees, LogitBoost, AdaBoost, and AnyBoost, can also be used to train the classifier. The particular method of training the classifier depends on the specific application contemplated. The output of the trained classifier is one or more sets of classifier weights or parameters at block 470.

Example Classifier

Figure 5:
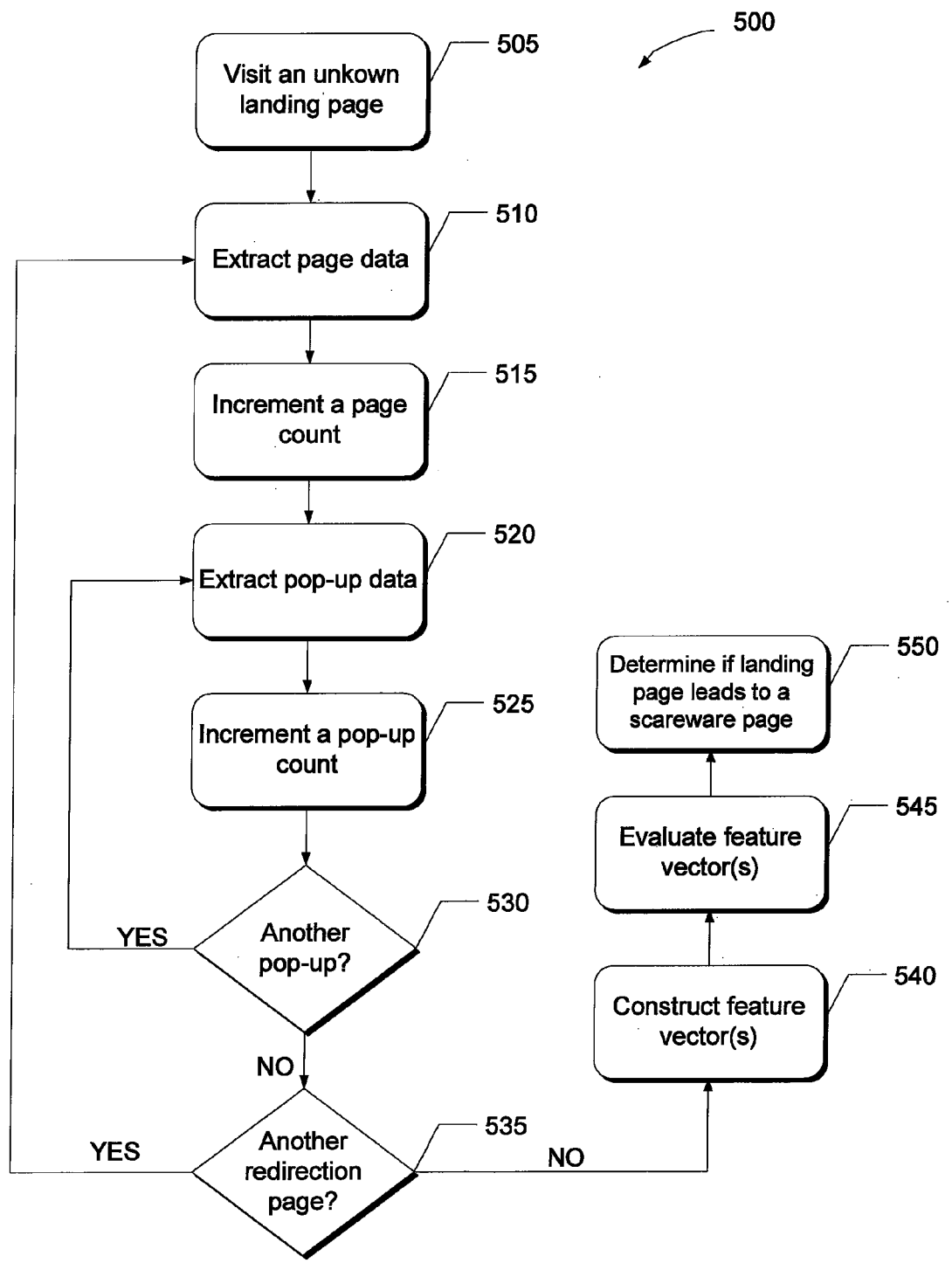
FIG. 5 is a flow chart depicting an embodiment of a process for using a classifier to detect scareware based on text extraction.

FIG. 5 depicts an example of a method 500 of using the trained classifier to evaluate an unknown landing page in accordance with one or more embodiments. The method can be implemented in connection with any suitable hardware, software, firmware, or combination thereof. In at least some embodiments, the method can be implemented by a search engine server, examples of which are provided above. At block 505, a crawler visits an unknown landing page (i.e., a landing page that has not been designated as scareware or non-scareware). One or more pop-ups are generated, and at block 510, the system extracts page data from the webpage. At block 515, a page count is incremented.

At block 520, pop-up data from a pop-up associated with the webpage is extracted, and at block 525, a pop-up count is incremented. At block 530, the system determines if another pop-up is associated with the page, and if so, the process returns to block 520 to extract data from the next pop-up. When no additional pop-ups are encountered, the process proceeds to block 535.

At block 535, the system determines if another redirection page is associated with the landing page or the current page. If there is another redirection page, the process returns to block 510 and extracts the page data from the next page. If there are no other redirection pages, the process proceeds to block 540.

At block 540, one or more feature vectors are constructed for the unknown landing page, redirection pages, and scareware page. The feature vector can include, but is not limited to features derived from the pop-up text, pop-up count, URLs, webpage, other data, and combinations thereof. At block 545, the one or more feature vectors constructed for the unknown landing page, redirection pages, and scareware page are evaluated using the classifier. To perform the evaluation, the classifier applies classifier weights or parameters (such as those output at block 470 of FIG. 4) to the unknown feature vector to produce an overall score or probability indicating whether or not the unknown landing page is scareware, shown as block 550.

In some embodiments, the features and data extracted from the unknown landing page are associated with a "scareware" label if it is determined that the page is likely to lead to a scareware attack. These features and labels can be used to provide additional information for and train the classifier to use in subsequent comparisons or evaluations.

Not all scareware pages employ pop-ups, however. Links to pieces of malware located on the internet can also be used in a scareware attack. The links can be either static (i.e., a hyperlink) or dynamic. Dynamic links include those links generated by obfuscated scripts (e.g., JavaScript®) in drive-by download attacks. Links can be found in the HTML content of the landing page or in pop-ups. In some embodiments, the system detects scareware based on the presence of a link to a malware executable or other webpages previously determined to be associated with scareware attacks.

From each malware executable, the URL of the location on the internet and one or more identifiers are known. The identifiers can, in some cases, be unique identifiers, such as the SHA1, SHA256, or MD5 hash. Hash algorithms sometimes generate collisions, so in some cases, the identifiers are not truly unique. The URL, identifier, or a combination thereof can be matched with the downloaded file.

In an example method of using URLs associated with static links in the static web map to detect scareware, a web crawler crawls all, or a subset of all, of the webpages on the internet. The crawler can generate a static web map to indicate which webpage URLs link to other webpage URLs. Separately, URLs pointing to known malware on the internet (as determined by the unique ID of the executable) are collected. For example, telemetry from an anti-malware engine, a web browser, or the URLs from a static web map can be used to identify and download executables from the internet. If a link matches a URL of a page that was previously determined to be associated with scareware attacks, the landing page containing the link can be identified as scareware. The match can be an exact match, in which the URLs are identical, or it can be a generic detection using an imprecise match, such as a regular expression. The identification of malicious pages using exact matches of URLs is more fully described in U.S. Ser. No. 12/421,644, in the name of Stokes, et al., the disclosure of which is incorporated by reference herein in its entirety.

In some embodiments, dynamic links can be evaluated and used to detect scareware pages. In such embodiments, if the landing page redirects to one or more webpages located on other servers containing or generating links pointing to malware associated with scareware attacks, the landing page is marked as scareware.

In an example method of using identifiers to detect scareware, a scareware attack is detected if the unknown executable referenced by a link matches any one or more known hashes of malware used in scareware attacks. The unknown file is downloaded and tested before execution. The test can include an exact match of the identifier or be detected by one or more generic methods, such as the use of an anti-virus engine. When a match is located, the landing page is marked as a scareware page.

In another example method, a classifier evaluates the static and/or dynamic features of the unknown file downloaded to the machine. If the file classifier predicts that the unknown file belongs to a family used in other scareware attacks, the landing page is marked as a scareware page.

In addition to the extraction of information from webpages and pop-ups or alternatively, image detection techniques can be employed to identify scareware pages. Because scareware attacks generally rely on social engineering, the final rendered scareware page or pages appear realistic to some population of computer users. While an expert can identify problems with a scareware page, naive users often don't notice the problems and can be tricked into providing their credit card numbers and/or downloading malware. Image detection methods can differentiate legitimate-looking scareware pages from non-scareware pages based on problems that a user might be oblivious to.

In embodiments using an image detection technique to predict whether an unknown page is a scareware page or non-scareware page, one or more images are selected from which features are generated. Images from both scareware and non-scareware pages are used, along with subimages of one or more images. When used herein, the term "images" can include, but is not limited to, images loaded by HTTP requests; screenshots of a webpage; images, icons, and visual features on a rendered page; components on the rendered page; and subimages of one or more images. Features from the images and that can help discriminate scareware from non-scareware are then extracted to create a feature set. The feature set is based, in part, on interest points and image descriptors derived from the raw images, and is used to build a matcher or classifier, depending on the specific method employed. Once the matcher or classifier is built, unknown images can be processed and a prediction is made as to whether the unknown image is scareware or non-scareware.

Figure 6:
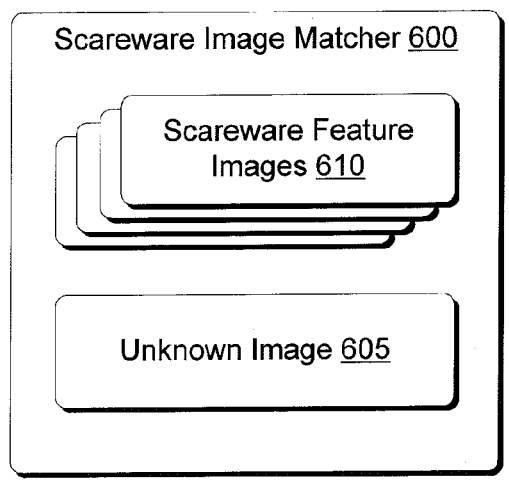
FIG. 6 depicts an example embodiment of a scareware image matcher.
Figure 7:
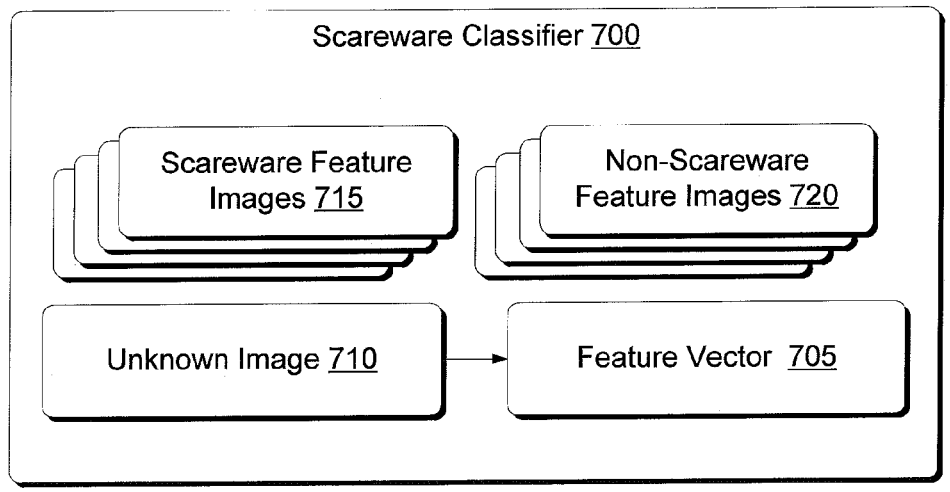
FIG. 7 depicts an example embodiment of a scareware image classifier.
Figure 8:
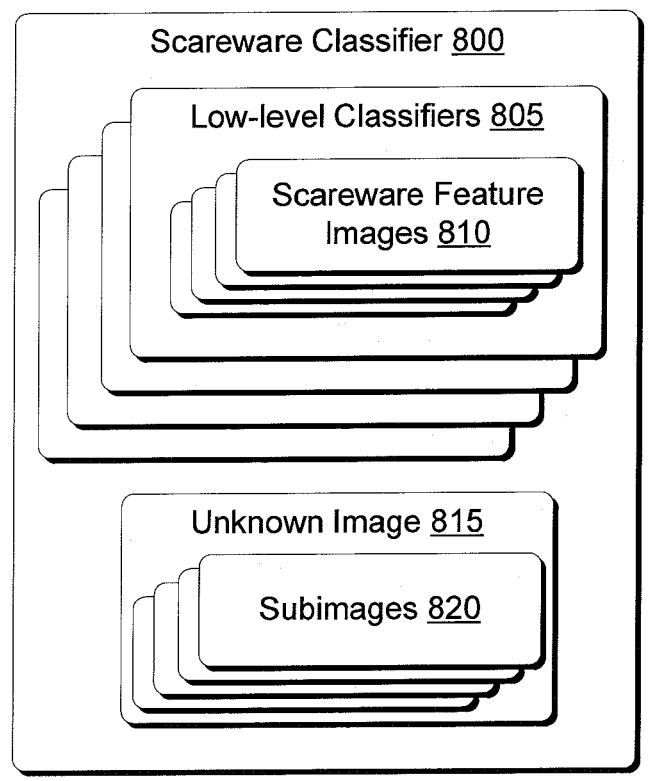
FIG. 8 depicts an alternative embodiment of a scareware image classifier.

FIGS. 6, 7, and 8 illustrate three high-level methods for either matching or classifying unknown images generated after visiting a landing page as being indicative of scareware pages or non-scareware pages. Unknown images are images from an unknown landing page that have not yet been classified as either indicative of a scareware page or a non-scareware page.

FIG. 6 represents a scareware image matcher 600 (such as feature matcher 308 in FIG. 3) where an unknown image 605 is compared to each of the scareware feature images 610 known to be associated with scareware pages (such as those from reference feature data 310 in FIG. 3). If the unknown image 605 matches one or more of the scareware feature images 610, then the unknown image 605 is determined to be a scareware image (i.e., an image indicative of a scareware page). Some of the feature images may be the entire image rendered by a known scareware site while other feature images may be subimages from known scareware sites (e.g. progress bars, pop-up images, system folder icons), screenshots, or images, icons and visual features on the rendered page. The image matcher need not make exact matches between the unknown image and the feature images. Methods described below can be used to make the match invariant to scale, translation, rotation, and other lighting changes. An unknown image 605 can be determined to match a known scareware feature image 610 if the size of the image falls within a predetermined range (e.g., larger than 10K and smaller than 500K) and match point percentage is greater than a prescribed threshold. For example, the match point percentage could be calculated as follows: interest points of the feature image are matched against the test image and the minimum of unique match points of the feature image and test image are divided by the minimum of interest points of the feature image and test image to obtain a score. A threshold (e.g., 0.6) is applied to determine whether a match occurred. For example, a match point percentage greater than the threshold is determined to indicate a match occurrence.

While scareware image matching techniques can find existing attacks, they may miss new, but similar attacks since the methods attempt to match an entire image or individual images. Furthermore, only matching an image may lead to false positives where an image rendered by a benign landing page is determined to be a scareware attack. To overcome these limitations, two alternate scareware image classifiers are shown in FIGS. 7 and 8, respectively.

In FIG. 7, scareware classifier 700 derives feature vector 705 from unknown image 710. Feature vector 705 is composed of one or more features corresponding to one or more feature images. In another embodiment, unknown image 710 can be broken down into one or more images, each image corresponding to a feature image. Scareware classifier 700 also includes scareware feature images 715 (e.g., feature images from known scareware pages) and non-scareware feature images 720 (e.g., feature images from known benign or non-scareware pages or otherwise not associated with scareware pages). Providing non-scareware feature images 720 allows the scareware classifier 700 to learn weights or parameters corresponding to non-scareware feature images 720 in addition to weights or parameters for scareware feature images 715. Examples of features pertaining to an individual feature image include counts or transformation of counts (e.g. log(x)) of the number matching interest points, histograms of scores indicating the similarity between the region around an interest point in an unknown image and the region around the corresponding interest point in the individual feature image, and features from other data associated with the image (e.g. URL, optical character recognition of text in the image). Automatic feature selection can also be used to select only features which most highly discriminate between scareware and non-scareware images. Scareware classifier 700 combines the elements in the feature vector 705 according to classifier weights or parameters to produce an overall score or probability that the unknown image 710 was extracted from a scareware page.

A scareware image matcher matches an unknown image to a known scareware image. Images include any visual components of a webpage, including but not limited to images loaded by HTTP requests; screenshots of a webpage; images, icons, and visual features on the rendered page; and components on the rendered page. The matching algorithm is able to match these images and can be invariant to scale, translation, rotation, and other lighting changes. The image matching score determines a matched based on a large percentage or number of matching interest points and image descriptors. As a result, while an image matcher attempts to match an entire image or large parts of an image, it may fail to detect scareware images which contain only a small number of items which are either exact matches or similar to those found in other scareware attack images, but lack a sufficient number of matching items between the unknown image and the scareware feature image. For example, the image matcher may fail to declare an exact match when analyzing a new scareware attack image combining the disk drive icon which is similar to a disk drive icon in a first scareware attack image and a progress bar which matches the progress bar found in a second scareware attack image.

A scareware image classifier differs from a scareware image matcher in that it may combine features from a set of scareware attack images and use those features to predict if an unknown image employs any of these features. The scareware classifier can learn to identify new scareware images which were not included in the training set in order to account for attackers who often change parts of their system, including altering the image displayed to the user, to avoid detection. A second type of scareware classifier can combine other features derived from the image in addition to the information contained in the pixels. For example, text can be extracted from the image using optical character recognition and this text can be used from one or more known scareware images to determine a set of words which are indicative of scareware.

FIG. 8 depicts an alternative scareware classifier 800. Scareware classifier 800 is used to predict whether an unknown landing webpage is, or leads to, a scareware page. The scareware classifier can be trained using a standard algorithm such as a logistic regression, support vector machine, naïve Bayes, decision tree, or the like. The scareware classifier 800 can also be a hierarchical or ensemble-type classifier such as boosted decision trees or other type of boosted algorithm. A hierarchical classifier can be used in two different ways. In one method, it can be used to classify based on a hierarchical set of labels. For example, a related group of attacks can be a parent label and each of the individual variants of attack images can be children of the parent label. The classifier can then learn to detect an individual type of attack (i.e., the leaf note label) or the attack group (i.e., the parent label) In this case, an unknown landing page can be predicted to belong to an individual attack group or a variant of an attack group.

In another type of hierarchical classifier structure, such as the one shown in FIG. 8, the low-level classifiers 805 can detect specific indications of a scareware attack. For example, one low-level classifier 805 may be a pop-up scareware classifier. A second low-level classifier 805 may be a scareware image classifier for one scareware attack image. A third low-level classifier 805 may be a scareware image classifier for a second scareware attack image, and so on. Each low-level classifier 805 compares the images 820 of unknown image 815 to the scareware feature images 810 and non-scareware images. Each low-level classifier 805, based on its evaluation of one or more subimages 820, produces a score or probability that the unknown image 815 matches an individual scareware feature image 810. In this sense, scareware classifier 800 in FIG. 8 is similar to the scareware image matcher 600 in FIG. 6. If the unknown image 815 matches a scareware feature image 810 or contains a feature subimage exactly, a high score or probability is produced. The hierarchical scareware classifier 800 weights and sums individual scores from each low-level classifier 805. Alternatively, the scareware classifier 800 evaluates the scores from the low-level classifiers 805 using ensemble-type classifiers such as boosted classifiers (e.g. LogitBoost, AdaBoost, AnyBoost) to produce a final score or probability indicating that the unknown image 815 was extracted from a scareware or benign landing page.

Preprocessing

Figure 9:
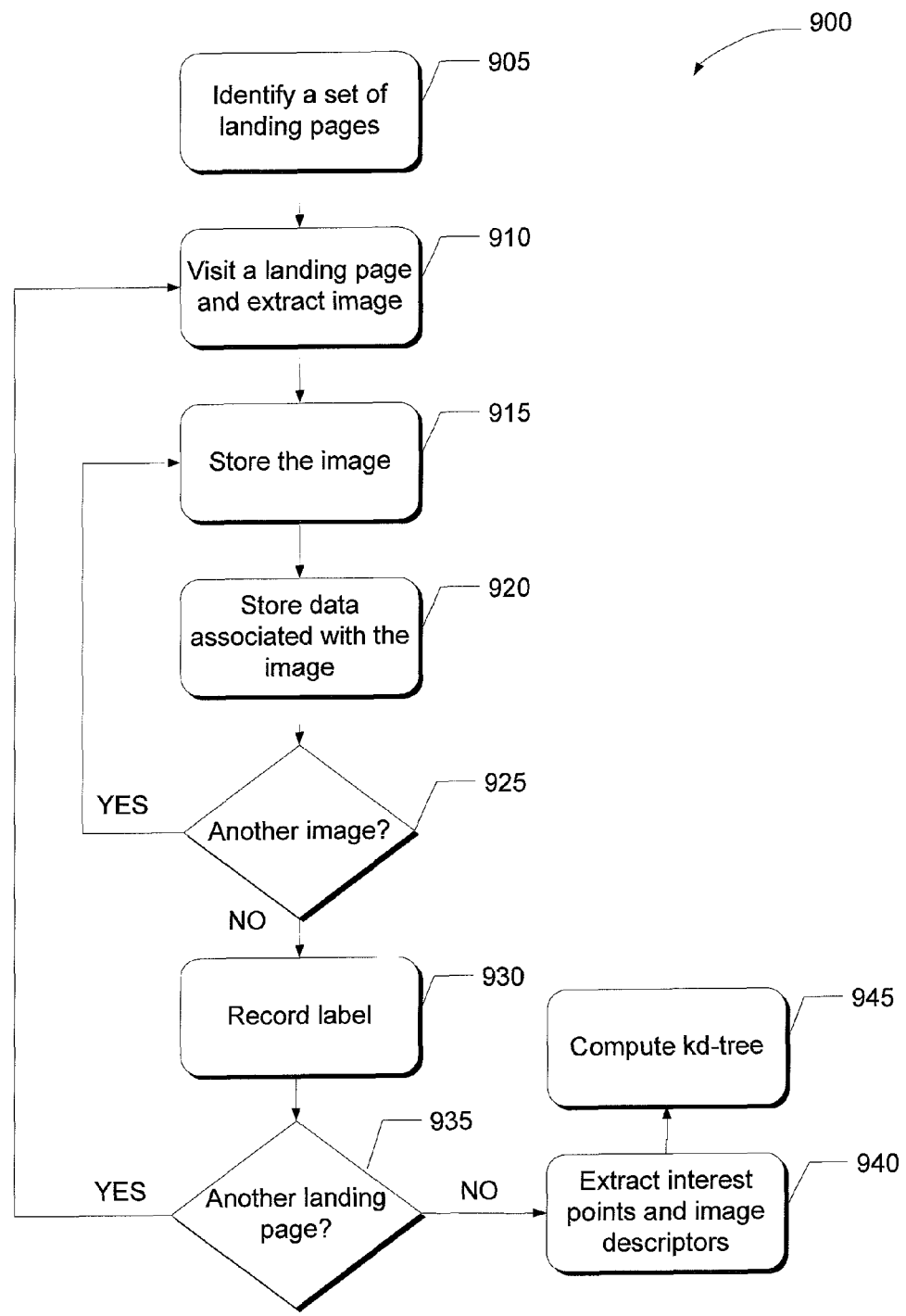
FIG. 9 is a flow chart depicting an embodiment of a process of preprocessing for image matcher and image classifier systems.

FIG. 9 depicts an example preprocessing process 900 that can be used in conjunction with both scareware image matchers (such as in FIG. 6) and scareware image classifiers (such as those shown in FIGS. 7 and 8) in accordance with one or more embodiments. The process can be implemented in connection with any suitable hardware, software, firmware, or combination thereof. In at least some embodiments, the process can be implemented by a search engine server, examples of which are provided above. The outputs of the preprocessing can include interest points, image descriptors, and a kd-tree. At block 905, a set of landing pages is selected from which to create the outputs. At block 910, a landing page in the set is visited and an image is extracted from the page. Images can include any visual components of a webpage, including but not limited to images loaded by HTTP requests; screenshots of a webpage; images, icons, and visual features on the rendered page; and components on the rendered page. At block 915, the image is stored, and at block 920, other data associated with the image is stored. At block 925, a decision is made as to whether there is another image on the page, and if so, the image is extracted and the process returns to block 915. The loop continues until a predetermined number of images have been extracted from the landing page and stored. The predetermined number of images will depend on the specific embodiment, and can be any number of images ranging from one to all of the images on the landing page. At block 930, the landing page is labeled as scareware (indicating that the page is likely scareware) or non-scareware (indicating that the page is likely non-scareware), and the label is recorded. At block 935, the system determines if other landing pages need to be processed. If so, the process again returns to block 910 and begins extracting one or more images from the next landing page in the set. These loops continue until the selected images have been extracted and stored from each of the landing pages in the set. When no further landing pages are in the landing page, the process proceeds to block 940.

At block 940, interest points and image descriptors from each of the labeled images and screenshots are extracted. Interest points are points in an image which can be reliably located across multiple views by an interest point detector algorithm. They look fairly distinctive in that they contain 2D structure and can be localized in the X and Y directions. Most interest point algorithms work by detecting points which lie on corners or else in the middle of blob-like regions. In some embodiments, interest points are fairly stable against translation, rotation and scaling, affine deformation, and stable against brightness and contrast variations. Most interest point algorithms work on multiple size scales and detect these locations to sub-pixel accuracy which facilitates matching over a range of view differences.

Interest Points

In some embodiments, when interest points are detected, an interest point algorithm estimates a scale and/or orientation and associates it with the location of the point. In some embodiments, estimating a scale means estimating the size of the blob-like region which is detected as the interest point. In some embodiments, estimating the orientation means building a histogram of the feature orientations in the vicinity of the interest point and picking a dominant one. Other methods of estimating scales and orientations can be used, depending on the specific application contemplated and the particular interest point algorithm employed. Obtaining a canonical scale and orientation at the location of the interest point allows points to be matched in such a way as to be invariant to image scaling and orientation.

Image Descriptors

In some embodiments, image descriptors are used to facilitate the matching of interest points. Image descriptors include appearance data in the vicinity of each interest point used. In other words, in order for a point in one image to be called a match to a point in another image, the image should be similar around the location of the two interest points, taking into account the unknown rotation and scaling between the two. Making use of the local appearance opens up a set of very rapid matching technologies that don't involve exhaustive comparisons between interest points.

To capture local appearance, an image descriptor is computed at each interest point. These descriptors are vectors of numbers which characterize a region of image space and are obtained by compressing the pixel data down to only a few dimensions using a descriptor algorithm. The input to a descriptor algorithm is a square patch, e.g., 18×18 pixels, which is cut out of the image centered on an interest point, and the output is a short list of numbers, e.g., a descriptor vector of 32 bytes. One descriptor vector is associated with each interest point so that when interest points need to be matched, the descriptor vectors from the two images are compared and the descriptor-space distance acts as a similarity measure. The comparison function takes two descriptors and computes a scalar which indicates the integrity of the match. Typically, this function is the geometric distance between the two descriptor's when they are expressed as points in the associated space.

In order to enjoy scale and orientation invariance during matching, the pixel patches which are input to the descriptor algorithm are cut out of the image at a scale and orientation which corresponds to the canonical scale and orientation computed for the interest point. This means that if an image is rotated or scaled, the patch which is cut out will track the changes and look similar. This relies on accurate estimation of scale, orientation, and the interest point location, which is not always the case. As a result, the descriptor algorithm which computes the compressed representation can be partially invariant to errors in the estimation of these parameters. It should also be invariant to lighting changes, shadows, and partial occlusion of the region around the interest point. For example, a pop-up in a scareware page may partially occlude a subfeature image. The algorithm therefore has a fairly difficult set of requirements to meet in order to obtain a limited set of numbers which do not vary much under these conditions while at the same time uniquely characterizing the local image region. Descriptor algorithms based on difference of Gaussian, or Harris corners, as the patches are centered on real interest point detections have been extensively computer optimized to meet these goals. See, for example, Winder, S., Hua, G., and Brown, M., "Picking the Best DAISY," *International Conference on Computer Vision and Pattern Recognition* (*CVPR09*), Miami, June 2009, pages 178-185, the full disclosure of which is incorporated by reference herein. In an alternative embodiment, other types of standard image processing features such as SIFT (scale-invariant feature transform) are used to detect and match feature image.

Kd-Trees

Matching interest points between images can be a time consuming procedure. For example, if 1000 interest points are detected for each of 1000 images, then exhaustive pair-wise matching of points is impractical (involving on the order of $10^{12}$ descriptor comparisons). Kd-trees can improve the matching efficiency in these scenarios. At block 945, one or more kd-trees are computed for predicting if unknown images were extracted from scareware or non-scareware webpages. The kd-trees can be used for both the image matching algorithm as well as the image classification algorithms.

In some embodiments, a kd-tree is a database containing all the descriptors from an image, each with a paired ID. Once the kd-tree is built, it can be queried using the descriptors from an image to be matched. For each query descriptor, the kd-tree algorithm returns a ranked set of nearest neighbors from the database image. The first nearest neighbor can then be compared with the k-th nearest neighbor and the ratio test performed to determine if there is a match. If so, the ID for that first neighbor is used to reference back to the associated database image interest point. The query operation into the kd-tree is very fast because the tree organizes descriptors so that those which are close together live in nearby regions of the data structure, resulting in efficient searching.

To ensure fast operation, kd-trees typically use an approximate nearest neighbor search. This means that the results may not be identical to an exhaustive search, though the parameters of the tree specify the degree of approximation and are chosen to maintain a low error rate with rapid querying. Interest points can be matched at video rates (to detect scareware animations such as dynamic pop-ups or moving progress bars) against databases containing points from hundreds of images.

In some embodiments, when multiple images need to be matched, a single kd-tree stores all the descriptors for all the images. In such embodiments, each descriptor in the kd-tree is associated with an ID which indicates the image it comes from as well as which interest point. The composite tree is queried with descriptors from an image of interest and returns ordered lists of distances to descriptors from all of the database images. In some embodiments, the kd-tree is set up to limit the range of images to be considered when returning data if image to image matching constraints are known. A single query results in candidate matches over a set of images. An outlier distance is determined which can be the k-th nearest neighbor, where k is larger than the number of images. Any distances at the beginning of the ordered list which are less than, possibly a fraction of this outlier distance by the appropriate ratio are considered as matches, and their interest point IDs and image numbers are noted.

To determine if an unknown image matches one or more of the scareware feature images, the number of interest point matches between the query image and the set of feature images in the database is counted. If the number of interest point matches is greater than a threshold (e.g., 10), a match between the query image and feature image is declared.

Statistical Image Classification

In some embodiments, a statistical image classifier is used instead of an image matcher. In some such embodiments, numerical features based on a similarity between the image descriptors associated with the predetermined interest points of the featured images derived from the labeled set and those from the unknown image are generated and used to train a classifier. In other such embodiments, the classifier can be trained based on the similarity scores between the image descriptors which are chosen throughout the distribution of image descriptors instead of those located at predetermined interest points.

For the image classification algorithms, features are selected, based on all of the interest points, image descriptors, other data, and labels from the images and subimages and a classifier is built (not shown). Training the classifier produces a set of weights or parameters for the scareware image classifier. The features can be used to construct the overall feature vector or each of the individual feature image feature vectors. One feature in the feature vector is the number or the transformation of the number (e.g., $\log(x)$) of matching interest points for a test image and each of the feature images. Matching images tend to have a large number of matching interest points. However, non-matching images can also result in a small number of matching interest points. As a result, the number of matching interest points can be indicative if the test image matches the feature image. Additional features can be constructed from the ratio test scores and/or the image descriptor distances. For example, a histogram can be constructed based on the ratio scores for all of the matching interest points. The number of bins (e.g. 20) can be chosen to trade off having features which are more precise (narrow bins) versus more general (wider bins). A normalized, or un-normalized, count for each of the bins can be used as an additional set of features. Similarly, a histogram of each of the interest points can be constructed and used as an additional set of features. Furthermore, histogram-based features from both the ratio scores and the descriptor distances can be aggregated as features. In the case where no interest points match, these feature values are all set to zero or some other value.

Alternatively, one can match a known scareware feature image if the size of the image falls within a predetermined range (e.g., larger than 10K and smaller than 500K) and match point percentage is greater than a prescribed threshold. For example, the match point percentage could be calculated as follows: interest points of the feature image are matched against the test image and the minimum of unique match points of the feature image and test image are divided by the minimum of interest points of the feature image and test image to obtain a score. A threshold (e.g., 0.6) is applied to determine whether a match occurred. For example, a match point percentage greater than the threshold is determined to indicate a match occurrence. Additional features can also be constructed from the additional data associated with the image or from optical character recognition.

Example Embodiment

Figure 10:
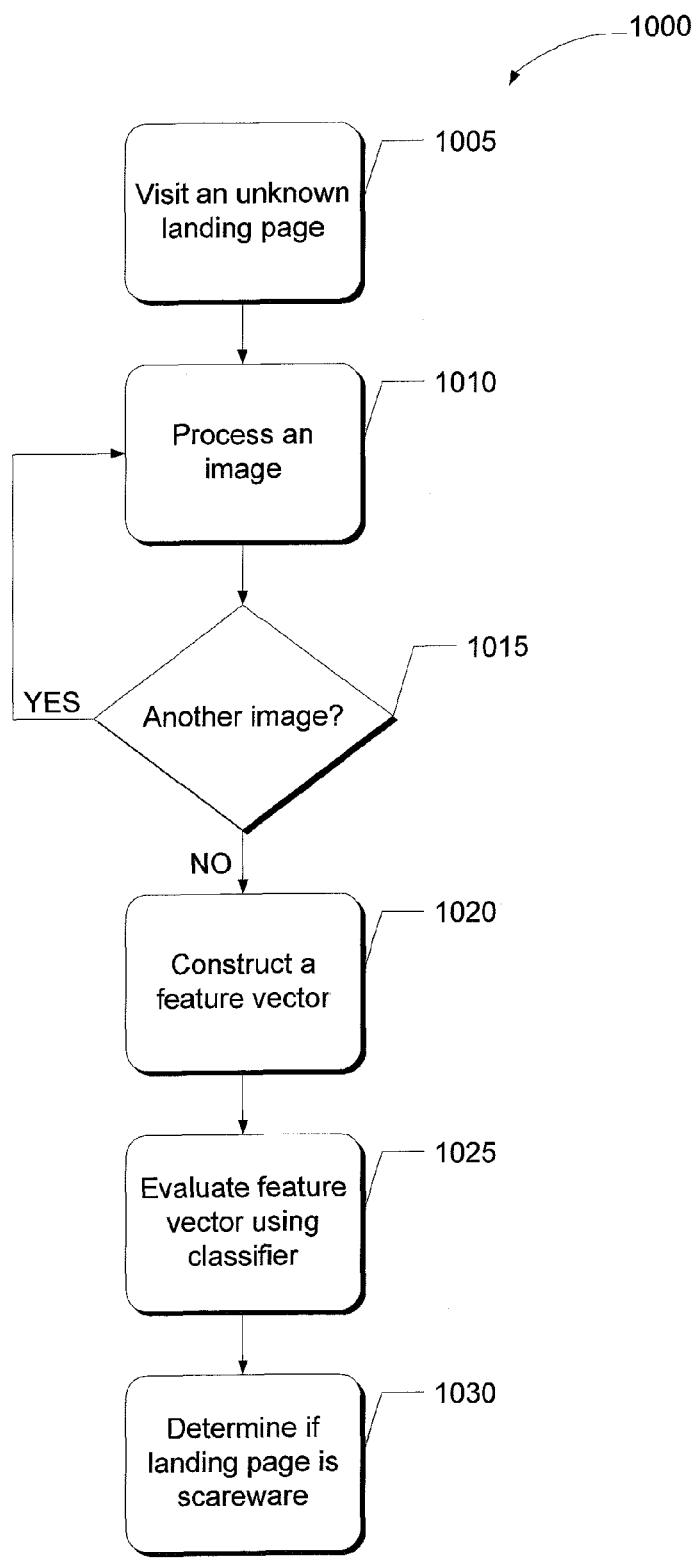
FIG. 10 is a flow chart depicting an embodiment of a process for detecting scareware using a classifier.

FIG. 10 depicts an embodiment of a process 1000 for detecting scareware using a classifier, such as the classifier resulting from the method shown in FIG. 9 in accordance with one or more embodiments. The process can be implemented in connection with any suitable hardware, software, firmware, or combination thereof. In at least some embodiments, the process can be implemented by a search engine server, examples of which are provided above. The search engine (e.g., search engine 114 in FIG. 1) visits an unknown landing page at block 1005. At block 1010, a first selected image on the page is processed. Images can include any visual components of a webpage, including but not limited to images loaded by HTTP requests; screenshots of a webpage; images, icons, and visual features on the rendered page; and components on the rendered page. By "processed" it is meant at least that the image is extracted and stored, although other processing steps can be included, depending on the specific application contemplated. At decision block 1015, if another image is located on the page, the process returns to block 1010 to process that image. The loop continues until all selected images on the page have been processed. At block 1020, a feature vector is constructed from one or more of the processed images and the data associated with them.

At block 1025, the feature vector constructed in block 1020 is evaluated using the classifier. In one embodiment of block 1025, the feature vector is compared to previously detected scareware feature vectors, such as those stored in reference feature data 310 in FIG. 3, by the classifier to determine a level of similarity between previously detected scareware features and the feature currently being evaluated. Evaluating the feature vector constructed in block 1020 with the classifier in block 1025 produces a score or probability which is used at block 1030 to determine if the landing page is a scareware page or non-scareware page.

Because the process evaluates features in the images constructed robustly in a way that is invariant to rotation, scaling, and typical photometric changes, the process can handle some types of obfuscation where an attacker randomly moves various items in the scareware page or varies the brightness or contrast in order to avoid detection of automated methods seeking to make an exact match. Once corresponding feature points have been detected, characterized and matched, there can be an optional stage to estimate the implied geometric transformation between the images. The geometric transformations can be used to ensure multiple interest points match between the unknown image and the feature images and are arranged in the same geometric pattern. If multiple interest points match and are located in the same layout after a geometric transformation, then the confidence of a true match is increased as compared to only considering interest points and/or image descriptors in isolation. The geometric transformation can learn various changes in the image such as scale, translation, and rotations.

There are a number of approaches to geometric matching depending on the complexity of the spatial model. Examples include 2D similarity, affine, or perspective matching, 3D camera rotation, 3D view matching using the fundamental matrix, or else 3D reconstruction using structure from motion, often over multiple images.

Geometric matching is an example of robust parameter estimation in which a set of parameters (4 for a similarity match, 6 for affine, and 8 for perspective) is computed given prior knowledge about the likely range of parameters and a set of (possibly erroneous) point matches. In some embodiments, RANSAC (Random Sampling and Consensus) is used to obtain initial parameter estimates together with a list of statistical inliers, and followed with a refinement step.

The RANSAC algorithm relies on directly computing transformation matrix parameters from a minimum subset of the point matches. For example, a similarity transform (translation, rotation and scale) can be computed from two points in correspondence between two images. Once a candidate geometric transformation has been obtained, it can be validated by testing it on all the other point matches in the data set, generating a count of the number of inliers which are points that project spatially with sufficient accuracy. In summary, the RANSAC algorithm proceeds as follows: 1) randomly pick a minimal set of point matches, 2) compute the transformation parameters from this set, 3) validate these parameters by counting the number of inlier matches, and 4) record the best transformation so far. This procedure is repeated a fixed number of times to the point that the probability of finding a good set of transformation parameters is sufficiently large given the data mismatch rate.

An improvement on this basic RANSAC algorithm makes use of Bayesian statistics. Rather than counting inliers, a log probability score for each random transformation is computed from all the point matches. This score includes two parts: 1) a prior probability score which depends on the parameters and how far away they are from commonly expected values, and 2) a probability score based on a robust function of the re-projection distance of the point matches. This robust score favors points which project to the correct locations but allows outliers to coexist.

For some applications, the transformation matrix produced by the RANSAC procedure may be sufficient. In other cases, some sort of final polishing optimization on the parameters using Levenberg-Marquardt/gradient descent algorithms either on inliers or using robust error functions can be employed.

In some embodiments, interest point matching is performed by computing descriptors and performing a pair-wise comparison of descriptor space distances for interest points in different images. In some embodiments, pairs of images are identified as matches or non-matches when the descriptor space distance is below a pre-determined threshold. In alternative embodiments, a ratio test is used to identify matches. In embodiments using the ratio test, a query interest point from a first image is selected and its descriptor is compared with all the descriptors from a second image. Then, potential matches are ranked in order within the second image according to descriptor space distance, with the nearest neighbor in the first position. Due to the shell property of high dimensional spaces, the non-matching points in the second image tend to lie approximately the same descriptor space distance away from the query point from the first image. This distance is called the outlier distance, and can be estimated from the k-th position on the rank-ordered list. The best candidate match from the first image to the second image is the first one on the rank-ordered list and this is compared against this outlier distance. The two interest points are deemed to be matching if the best distance is much smaller than the outlier distance according to a fixed ratio.

In some embodiments, descriptors are computed on a regular grid over the image rather than interest points, leading to a fixed number of descriptors for each image. Various image similarity measures use this approach as well as some facial recognition algorithms. In such embodiments, descriptor algorithms can be computed densely on the image without extracting overlapping square pixel patches. Other algorithms for determining matches between images can be used, depending on the specific application contemplated.

In some embodiments, rather than storing image descriptors in a kd-tree, quantization of descriptors to provide a bag of words approach is employed. In such embodiments, the descriptor space is divided into a fixed number of domains and each one is given an index. When each descriptor vector is computed, it is mapped onto the index number of the domain in which it belongs. Each descriptor is quantized to such a word and the list of those index numbers is used to characterize each image. The set of domains is known as the vocabulary and can consist of up to about 100,000 words or more, depending on the specific application contemplated.

In some embodiments, inverted indexes are used to facilitate rapid lookup in a database containing millions of images for matching. For example, in embodiments using a quantized vocabulary as described above, a few hundred index words are generated from the interest points in each image. Since there may be on the order of 100,000 possible words, one image will only reference a few of them. To form the inverted index, a list of image IDs is maintained for each of the words in the vocabulary. At lookup time, each quantized word is looked up in this table and a list of all images containing that word is retrieved. This is repeated for each word in the query image. The resulting set of lists can then be intersected to give a list of images that contain all the same words as the query image. This cuts down the number of images that need to be carefully checked using a geometric verification procedure. In some embodiments, weights to add importance to words that are frequent within the image and to de-emphasize common words in the database which have poor levels of discrimination (tf-idf weighting) are employed.

Locality sensitive hashing is an example probabilistic technique that can be used to perform dimensionality reduction and nearest neighbor search. In some embodiments, similarity measures between the bag of visual words in the query image and all the bags of visual words in the large database which can contain millions of images are computed. A binary vector of length equal to the number of words in the vocabulary, e.g., 100,000 words, where each bit indicates whether or not a particular quantized feature word is present in the image. In this embodiment, word frequencies are ignored. Next, a similarity measure between two images is defined as the ratio of the number of bits set in the intersection of the two vectors divided by the number of bits set in the union of the two vectors. More bits set in the intersection means that there are more of the same visual words in common between the two images.

For each image the sequence of min-hash values is divided into equal-sized chunks called sketches to improve the efficiency of lookup. A min-hash is a single number computed from a binary vector such that two vectors have the same value of min-hash with a probability equal to the value of their similarity measure described above. A pre-defined set of randomly formed min-hashes are computed in the same way for each binary vector representing an image in the database. If the same set of hashes is calculated on the binary vocabulary vector of the query image then these hashes will be identical with ones in the database with a probability equal to the image similarity measure.

Each sketch together with its image ID can be placed into a standard hash table. Lookup proceeds by evaluating the min-hashes from the query, forming the sketches, and looking up the image IDs. Once a set of candidate sketch-hit images have been discovered, the similarity measure for each one can be estimated by counting the number of identical min-hashes between the query and the returned images. The retrieval procedure estimates the similarity measure only for images which have at least X identical sketches out of Y total sketches.

In some embodiments, an off-line training phrase is used to divide up the descriptor space into discrete words. A plurality of images is used as a training set and descriptors are computed from each one and they are all pooled together. A clustering technique is then used to find the hotspots of descriptor density in the descriptor space and to assign a cluster center to each. In some embodiments, hierarchical k-means clustering is used to assign cluster centers. Hierarchical k-means clustering recursively clusters the training data in descriptor space. For example, the data is clustered into five clusters using k-means. After this, the data is split and assigned to its closest cluster center which leads to five sub-sets. Data assignment is conducted according to proximity to the cluster centers, resulting in a set of Voronoi boundaries. The five sub-sets of data are themselves then each clustered with five new centers using k-means. This hierarchical process is repeated to the desired depth level. The result is a tree of cluster centers which can be used to quantize descriptors when the system is used online.

Each descriptor from a query image is quantized by assigning it to the numeric index of its closest cluster center. To achieve high-speed throughput, a hierarchical approach is commonly used based on the tree computed at training time. In the current example, each descriptor would be compared first for proximity to the five cluster centers at the root node. It would then be assigned to the closest in descriptor space. Next, the descriptor would be compared to the five cluster centers associated with this chosen branch of the tree and would be assigned to the nearest center. This procedure repeats within the tree until the leaf nodes are reached which include the indices of words which form the quantized output of the algorithm.

In some embodiments employing image detection to detect scareware, the images on the final page that is displayed after navigating to a landing page are evaluated. However, in other embodiments, images on intermediate pages, such as redirection pages between the landing page and the final page, are also evaluated.

While image detection methods described thus far have considered only raw images extracted from a landing page, it is possible to combine image detection with the text detection methods also described above using optical character recognition (OCR). In some embodiments employing OCR, one or more in the labeled dataset are evaluated using an OCR component. In some embodiments, substantially all images in the labeled dataset are evaluated using the OCR component. The OCR component extracts text displayed in the image. The extracted words can be used to generate potential features similar to those described above for text in pop-ups and the HTML page. These word features can be added to the other features in the image matcher or image classifier to help improve the effectiveness of these components.

Lightweight classification is used in some embodiments to pre-select pages or URLs in the index in order to scale the index size to the search engine. Lightweight classification can be made based on URL and page properties, such as text, link structure, code constructs, attempts to hide code structures, information regarding webpages that link to the landing page (sometimes in the form of a web graph) and the like. Historical information in the index can be used to detect changes in such properties. Furthermore, lightweight classification can be based on network properties of where the page is hosted, such as the IP address, Autonomous System Number (ASN), and the name of the server. Once the features of the lightweight classifier are selected, the classifier is trained on a random selection of known scareware and non-scareware pages and could then be used to label unknown pages as "scareware likely" or "non-scareware likely." Pages classified as "scareware likely" can then be crawled using the instrumented browser for a more in-depth classification by the scareware classifier.

Regardless of how pages are evaluated and determined to be scareware or non-scareware, those pages labeled as scareware by the scareware classifier are removed from the search results returned by the search engine. In other words, tagged scareware pages are blocked from showing up as part of the search results. In some embodiments, the webpage owner is notified that his page has been labeled as scareware and was removed from search results. In some embodiments, the crawler will re-classify the pages labeled as scareware on a reoccurring basis to enable legitimate sites that were hacked to cause a scareware attack to return to search results when it has been cleaned. In some embodiments, the crawler re-classifies the pages on a weekly basis. In other embodiments, the crawler re-classifies the pages upon request from the webpage owner.

Example Computing System

Figure 11:
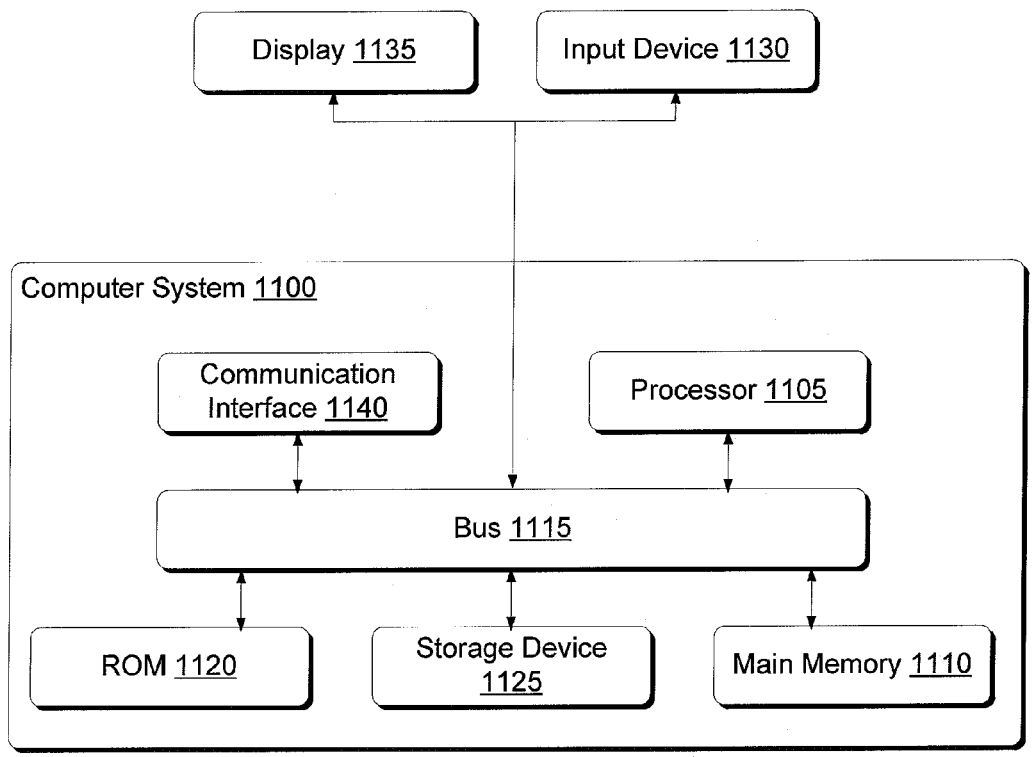
FIG. 11 illustrates an example computing device that can be used to implement one or more embodiments.

FIG. 11 shows an embodiment of a computer system 1100 having components that can be used to implement one or more of the embodiments described above. In some embodiments, the computer system 1100 is a search engine server computer hosting a search engine, or a user computing device executing browser. Computer system 1100 includes one or more processing units 1105, a main memory 1110, and a bus 1115 that couples various system components including main memory 1110 to processors 1105. The bus 1115 represents one or more of any of several types of bus structures, including a memory bus or memory controller, a peripheral bus, an accelerated graphics port, and a processor or local bus using any of a variety of bus structures. The main memory 1110 can be random access memory (RAM) or another dynamic storage device coupled to bus 1115 for storing information and instructions to be executed by the processor 1105. Main memory 1110 can also be used for storing temporary variables or other intermediate information during execution of instructions by the processor 1105. The computer system 1100 also includes read only memory (ROM) 1120.

Computer system 1100 further includes one or more storage devices 1125. Storage device 1125 can include a hard disk drive for reading from and writing to a hard disk, a magnetic disk drive for reading from and writing to a removable magnetic disk, and an optical disk drive for reading from or writing to a removable optical disk such as a CD or other optical media. The storage device, whether a hard disk drive, a magnetic disk drive, an optical disk drive, or a combination thereof, is connected to the bus 1115 by an appropriate interface. The drives and their associated computer-readable media provide nonvolatile storage of computer-readable instructions, data structures, program modules and other data for computer system 1100. Although the example embodiment described herein refers to a hard disk, a removable magnetic disk, and a removable optical disk, it should be appreciated by those skilled in the art that other types of computer-readable media which can store data that is accessible by a computer, such as magnetic cassettes, flash memory cards, digital video disks, random access memories (RAMS), read only memories (ROMs), and the like, can also be used in the example operating environment.

A number of program modules can be stored on the storage device 1125, RAM, and ROM, including an operating system, one or more application programs, other program modules, and program data. A user can enter commands and information into the computer system 1100 through input devices 1130 such as a keyboard or a pointing device. Other input devices 1130 can include a microphone, joystick, game pad, satellite dish, scanner, or the like. These and other input devices 1130 are connected to the processor 1105 through an interface that is coupled to the bus 1115. A monitor or other type of display 1135 is also connected to the bus 1115 via an interface. In addition to the monitor, personal computers typically include other peripheral output devices such as speakers and printers.

Computer system 1100 also includes a communication interface 1140 coupled to bus 1115. Communication interface 1140 provides a two-way data communication coupling to a network link that is connected to a local network, such as network 102 in FIG. 1. Communication interface 1140 can be an integrated services digital network (ISDN) card or a modem to provide a data communication connection to a corresponding type of telephone line or a local area network (LAN) card to provide a data communication connection to a compatible LAN. Wireless links can also be used, depending on the specific application contemplated. In any such implementation, communication interface 1140 sends and receives electrical, electromagnetic or optical signals that carry digital data streams representing various types of information.

Generally, the data processors of computer system 1100 are programmed by means of instructions stored at different times in the various computer-readable storage media of the computer. At execution, programs are loaded at least partially into the computer's primary electronic memory from the computer's secondary memory where they are stored. The invention described herein includes these and other various types of computer-readable storage media when such media contain instructions or programs for implementing the steps described in conjunction with a microprocessor or other data processor.

Although there is described herein a preferred embodiment of the present invention, it will be apparent that the invention is capable of numerous modifications and variations, apparent to those of ordinary skill in the art, without departing from the scope of the invention.

What is claimed is:

1. A computer-implemented method for detecting scareware comprising:
   accessing, using a web crawler and without regard to a particular search query, one or more webpages to be evaluated, at least one of which being a landing page effective to automatically access one or more redirection pages;
   comparing, using a classifier, the features extracted with features of known scareware and non-scareware pages, the known scareware and non-scareware pages having been previously classified by the classifier, the comparing comprising determining features effective to determine a likelihood that the landing page and the one or more redirection pages is a scareware page based on the number of times the considered feature occurs in the known scareware pages, the number of times the considered feature does not occur in the known scareware pages, the number of times the considered feature occurs in the known non-scareware pages, and the number of times the considered feature does not occur in the known non-scareware pages; and
   in response to determining the landing page or at least one of the redirection pages is a scareware page, storing page data and pop-up data associated with the landing page and any associated redirection pages with a label indicating the page data and pop-up data are associated with a scareware page, and storing reference feature data for the scareware page locally.

2. The method of claim 1 further comprising removing one or more landing page and one or more redirection pages from search results generated by a search engine when the one or more landing page and one or more redirection pages are determined to likely be a scareware page.

3. The method of claim 1, wherein the features are selected from the group comprising uniform resource locators (URLs), text, image interest points, image descriptors, a number of pop-ups generated, internet protocol (IP) addresses, hostnames, domain names, text derived from images, images, metadata, and identifiers of executables.

4. The method of claim 1 further comprising associating the one or more extracted features with a scareware label when the one or more landing page and one or more redirection pages are determined to likely be a scareware page effective to provide additional information for the classifier to use in subsequent comparisons.

5. The method of claim 1 further comprising:
   constructing at least one feature vector for the one or more landing page and one or more redirection pages;
   comparing the at least one constructed feature vector with at least one feature vector of known scareware and non-scareware pages.

6. The method of claim 1 further comprising wherein the determining features effective to determine a likelihood that one or more landing page and redirection page is a scareware page is based on an expression $$R = [\log(\Gamma(c_{11}+1)) + \log(\Gamma(c_{12}+1)) + \log(\Gamma(c_{21}+1)) +$$
$$\log(\Gamma(c_{22}+1)) + \log(\Gamma(c_{11}+c_{12}+c_{21}+c_{22}+4))] -$$
$$[\log(\Gamma(c_{11}+c_{12}+2)) + \log(\Gamma(c_{21}+c_{22}+2)) +$$
$$\log(\Gamma(c_{11}+c_{21}+2)) + \log(\Gamma(c_{12}+c_{22}+2)) + \log(\Gamma(4))]$$

where $c_{11}$ identifies the number of times the considered feature occurs in the known scareware pages, $c_{12}$ identifies the number of times the considered feature does not occur in the known scareware pages, $c_{21}$ identifies the number of times the considered feature occurs in the known non-scareware pages, and $c_{22}$ identifies the number of times the considered feature does not occur in the known non-scareware pages.

7. The method of claim 1, the one or more features comprising one or more images, the method further comprising:
   detecting one or more interest points in said one or more features;
   computing a descriptor at each interest point, the descriptor being a vector associated with each said interest point; and
   matching said one or more interest points detected in said one or more features with one or more interest points from a database of interest points, said matching being performed by comparing said descriptor of a first interest point in said one or more features with said descriptor of said one or more interest points in said database, and comparing a scalar to indicate a likelihood of a match.

8. The method of claim 7 further comprising employing a kd-tree to match said one or more interest points, said kd-tree storing said descriptors for said interest points and computing a rank ordered list of nearest neighbors for each image.

9. A system for detecting scareware, comprising:
a processor; and
a computer storage medium coupled to the processor, the computer storage medium storing instructions that cause the processor to execute modules comprising:
   a web crawler configured to select webpages;
   a feature extractor configured to extract a first feature from a first selected webpage;
   a feature classifier configured to classify the first extracted feature as indicative of either a scareware webpage or a non-scareware webpage and store reference feature data identifying the first feature and a classification, the feature classifier further configured to determine a likelihood that a landing page and one or more redirection pages is a scareware page based on the number of times the considered feature occurs in known scareware pages, the number of times the considered feature does not occur in known scareware pages, the number of times the considered feature occurs in known non-scareware pages, and the number of times the considered feature does not occur in known non-scareware pages; and
   a feature matcher configured to compare a second feature extracted from a second selected webpage to the first extracted feature to determine whether the second feature is indicative of a scareware webpage or a non-scareware webpage, the feature matcher further configured to, in response to determining at least one of the first webpage and the second webpage is a scareware page, store reference feature data for the scareware page locally.

10. The system of claim 9 further comprising a search engine operable to remove a reference to the second selected webpage from a search result list responsive to the second feature being indicative of a scareware page.

11. The system of claim 9, wherein the first and second features are of a type selected from a group comprising an image, text, and a pop-up.

12. The system of claim 9, wherein the second selected webpage is a landing page that automatically redirects a browser to at least one other webpage.

13. One or more computer-readable storage memories comprising computer-executable instructions, which, when executed, cause a computer to perform a process comprising:
   accessing one or more landing pages without regard to particular search queries, effective to automatically access one or more redirection pages and causing generation of at least one pop-up thereby;
   extracting and recording one or more features from at least one of the one or more landing pages, one or more redirection pages, and the at least one pop-up;
   comparing extracted features with previously extracted features of the one or more of at least one known scareware page and at least one known non-scareware page effective to classify the extracted features as indicative of a scareware page or indicative of a non-scareware page, the comparing comprising determining features effective to determine a likelihood that the landing page and the one or more redirection pages is a scareware page based on the number of times the considered feature occurs in the known scareware pages, the number of times the considered feature does not occur in the known scareware pages, the number of times the considered feature occurs in the known non-scareware pages, and the number of times the considered feature does not occur in the known non-scareware pages; and
   in response to determining the landing page or at least one of the redirection pages is a scareware page, storing page data and pop-up data associated with the landing page and any associated redirection pages with a label indicating the page data and pop-up data are associated with a scareware page, and storing reference feature data for the scareware page locally.

14. The computer-readable storage memories of claim 13, the at least one pop-up being generated by one or more of the one or more landing pages, at least one redirection page, at least one scareware page, and at least one non-scareware page.

15. The computer-readable storage memories of claim 13, wherein the extracted features are selected from a group of features including one or more words of text, one or more URLs, one or more IP address, one or more hostnames, one or more domain names, one or more images, and one or more links to HTML content.

16. The computer-readable storage memories of claim 15, the process further comprising:
   incrementing a pop-up count attributable to the one or more landing pages effective to determine if the one or more landing pages has caused generation of one or more pop-ups;
   classifying each of the one or more landing pages as one of a scareware page or a non-scareware page responsive to the one or more landing pages causing generation of one or more pop-ups;
   processing the extracted features from the one or more landing pages;
   constructing at least one dataset from the extracted features, the at least one dataset including a plurality of pop-ups for which the extracted features are associated with at least one of a scareware page and a non-scareware page;
   using the at least one dataset to train a feature classifier; and
   using the feature classifier to evaluate the one or more landing pages.

17. The computer-readable storage memories of claim 16 wherein the determining features indicative of a scareware page or indicative of a non-scareware page for inclusion in the at least one dataset is based on an expression $$R = [\log(\Gamma(c_{11}+1)) + \log(\Gamma(c_{12}+1)) + \log(\Gamma(c_{21}+1)) +$$
$$\log(\Gamma(c_{22}+1)) + \log(\Gamma(c_{11}+c_{12}+c_{21}+c_{22}+4))] -$$
$$[\log(\Gamma(c_{11}+c_{12}+2)) + \log(\Gamma(c_{21}+c_{22}+2)) +$$
$$\log(\Gamma(c_{11}+c_{21}+2)) + \log(\Gamma(c_{12}+c_{22}+2)) + \log(\Gamma(4))]$$

where $c_{11}$ identifies the number of times the considered feature occurs in the known scareware pages, $c_{12}$ identifies the number of times the considered feature does not occur in the known scareware pages, $c_{21}$ identifies the number of times the considered feature occurs in the known non-scareware pages, and $c_{22}$ identifies the number of times the considered feature does not occur in the known non-scareware pages.

18. The computer-readable storage memories of claim 16, the process further comprising constructing a feature vector corresponding to said at least one landing page for use in evaluating the landing page.

19. The computer-readable storage memories of claim 13, the extracted features comprising one or more images, the process further comprising:

detecting one or more interest points in said one or more features;

computing a descriptor at each interest point, the descriptor being a vector associated with each said interest point; and matching, using a kd-tree, said one or more interest points detected in said one or more features with one or more interest points from a database of interest points, said matching being performed by comparing said descriptor of a first interest point in said one or more features with said descriptor of said one or more interest points in said database, and computing a scalar to indicate a likelihood of a match.

20. The system of claim 9 wherein the web crawler is further configured to re-classify pages labeled as scareware on a weekly basis.

* * * * *